US008130902B2

(12) United States Patent
Adams et al.

(10) Patent No.: US 8,130,902 B2
(45) Date of Patent: Mar. 6, 2012

(54) HIGH-RESOLUTION, ACTIVE-OPTIC X-RAY FLUORESCENCE ANALYZER

(75) Inventors: Bernhard W. Adams, Naperville, IL (US); Klaus Attenkofer, Bolingbrook, IL (US); Oliver A. Schmidt, Lombard, IL (US)

(73) Assignee: UChicago Argonne, LLC, Chicago, IL (US)

( * ) Notice: Subject to any disclaimer, the term of this patent is extended or adjusted under 35 U.S.C. 154(b) by 949 days.

(21) Appl. No.: 11/831,518

(22) Filed: Jul. 31, 2007

(65) Prior Publication Data

US 2010/0027740 A1 Feb. 4, 2010

(51) Int. Cl.
*G01N 23/223* (2006.01)

(52) U.S. Cl. ............................................ 378/44; 378/84

(58) Field of Classification Search .................... 378/44, 378/82, 84; 359/331; 1/44, 82, 84
See application file for complete search history.

(56) References Cited

U.S. PATENT DOCUMENTS

| | | | | | |
|---|---|---|---|---|---|
| 2,543,630 | A | * | 2/1951 | Hansen | 378/84 |
| 3,885,153 | A | * | 5/1975 | Schoenborn et al. | 250/251 |
| 4,625,323 | A | * | 11/1986 | Okaya | 378/82 |
| 5,357,825 | A | * | 10/1994 | Costello et al. | 74/490.07 |
| 5,557,477 | A | * | 9/1996 | Sawicki | 359/846 |
| 6,038,285 | A | * | 3/2000 | Zhong et al. | 378/84 |
| 6,421,417 | B1 | * | 7/2002 | Jiang et al. | 378/84 |
| 6,459,767 | B1 | | 10/2002 | Boyer | |
| 6,486,573 | B2 | | 11/2002 | Yagi et al. | |
| 6,647,090 | B2 | | 11/2003 | Kawahara et al. | |
| 6,711,234 | B1 | | 3/2004 | Loxley et al. | |
| 6,937,691 | B2 | | 8/2005 | Yamagami et al. | |
| 2003/0128810 | A1 | * | 7/2003 | Verman et al. | 378/84 |
| 2005/0087699 | A1 | * | 4/2005 | Miyake | 250/492.1 |
| 2005/0162762 | A1 | * | 7/2005 | Novak | 359/849 |
| 2005/0247412 | A1 | * | 11/2005 | Bengtsson et al. | 160/265 |
| 2006/0103956 | A1 | * | 5/2006 | Griffith et al. | 359/845 |

OTHER PUBLICATIONS

Attenkofer et al., Tunable Highly Efficient Crystal Analyzer Based on Active Optics, Proc. SPIE, vol. 6317, 63170R, 2006.*

* cited by examiner

*Primary Examiner* — Edward Glick
*Assistant Examiner* — Mona M Sanei
(74) *Attorney, Agent, or Firm* — Joan Pennington

(57) ABSTRACT

Active optics apparatus and method for aligning active optics are provided for a high-resolution, active optic fluorescence analyzer combining a large acceptance solid angle with wide energy tunability. A plurality of rows of correctors selectively controlled to bend an elongated strip of single crystal material like Si (400) into substantially any precisely defined shape. A pair of pushers engages opposite ends of the silicon crystal strip exert only a force along the long axis of the crystal strip, and does not induce additional bending moments which would result in a torsion of the crystal.

19 Claims, 7 Drawing Sheets

PRIOR ART

500

HIGH-RESOLUTION, ACTIVE-OPTIC X-RAY FLUORESCENCE ANALYZER

The United States Government has rights in this invention pursuant to Contract No. W-31-109-ENG-38 between the United States Government and The University of Chicago and/or pursuant to Contract No. DE-AC02-06CH11357 between the United States Government and UChicago Argonne, LLC representing Argonne National Laboratory.

FIELD OF THE INVENTION

The present invention relates to an x-ray fluorescence analyzer, and more particularly to a high-resolution, active optic fluorescence analyzer combining a large acceptance solid angle with wide energy tunability.

DESCRIPTION OF THE RELATED ART

X-ray absorption/fluorescence spectroscopy probes with atomic selectivity the electronic state, e.g. valence state, or chemical bonding and the local structure of the absorber atom. By applying high-resolution fluorescence spectroscopy the selectivity of this method is highly increased and moreover the core hole lifetime broadening is reduced.

Fluorescence analyzers with electron-Volt resolution make it possible to determine the chemical speciation of samples containing multiple elements and a mixture of chemical phases and moreover allow a quantitative analysis and determination of the local environments of the interesting species. Therefore this kind of analytical tool is applied in areas like catalysis, environmental and industrial hygiene, nuclear waste management, semiconductor industry, or drug-development. More generally, the active optic concept of the analyzer facilitates the formation of any shape, so imaging the spatial distribution of a single element is also possible. Spatial resolution of the order of microns can be achieved.

FIG. 1 illustrates a prior art fluorescence analyzer that was designed based on the principle of active optics, using a number of mechanical actuators to bend a piece of silicon crystal into a precisely defined shape. The original analyzer consists of two pushers labeled riders in FIG. 1 that are moved along a respective rail to make a strip of silicon crystal buckle up, and a single row of eight correctors, labeled motor-driven micrometers, that fine-tune the shape of the strip to approximate that of a logarithmic spiral. Hand-driven micrometer screws incorporated into the pushers are used to balance the pushing forces across the width of the silicon strip, to minimize the torsion on the strip.

An important component of the device of the present invention is the alignment procedure to obtain the correct logarithmic shape for the pertinent fluorescence energy. A fully automated algorithm, not requiring any human interaction, has been developed for this purpose. By shaping the crystal very accurately, all rays within the solid angle covered by it are diffracted at the same wavelength toward the detector, which may lack spatial resolution. This device proved useful in a number of applications, including fundamental physics and trace-element analysis. With an energy resolution of about 5 eV at 10 keV combined with a wide tunability over 5 keV, it has surpassed existing designs with comparable application fields.

Principal aspects of the present invention are to provide a high-resolution, active optic fluorescence analyzer combining a large acceptance solid angle with wide energy tunability.

Other important aspects of the present invention are to provide such a high-resolution, active optic fluorescence analyzer combining a large acceptance solid angle with wide energy tunability, substantially without negative effect and that overcome some of the disadvantages of prior art arrangements.

As used in the following description and claims, the terms "crystal" and "silicon crystal" should be broadly understood to mean multiple different ordered structures including super mirrors and single crystal materials, and is not limited to silicon crystals.

SUMMARY OF THE INVENTION

In brief, active optic apparatus and method for aligning active optics are provided for a high-resolution, active optic fluorescence analyzer combining a large acceptance solid angle with wide energy tunability. The active optic apparatus includes a plurality of rows of correctors, with the correctors being selectively controlled to bend an elongated strip of silicon crystal into a precisely defined shape. A pair of pushers engages opposite ends of the silicon crystal strip to exert only a force along the long axis of the crystal strip, without inducing additional bending moments, which otherwise would result in a torsion of the crystal.

In accordance with features of the invention, the high-resolution, active optic fluorescence analyzer includes 3 staggered rows of correctors instead of just a single row with, for example, a total of 33 correctors. This corrector arrangement gives better control of the three-dimensional shape of the crystal, and specifically permits control over torsion and anticlastic bending.

In accordance with features of the invention, to accomplish a compact design all mechanics of the pushers and correctors are arranged for implementing heat-management and high packing density. The driver electronics for the actuators are integrated into the device thus eliminating the tangle of control cables and easy handling. The alignment procedure relies upon optical alignment and x-ray alignment steps.

In accordance with features of the invention, a frame that is only slightly larger than the analyzer itself is used to rock the entire assembly, which is necessary to fine-tune the correctors, as well as for energy scans over a fluorescent line. Due to its small size, the frame permits closely spaced arrangements of multiple analyzers for increased solid-angle coverage. Additionally, the housing may act as part of a vacuum chamber. The pushers and correctors are mounted on a rigid aluminum structure designed to minimize deformation due to mechanical loading. During operation, it will be kept at a substantially constant temperature independent from the environment temperature to eliminate deformations of the silicon strip due to the different thermal expansion coefficients of aluminum and silicon.

In accordance with features of the invention, the high-resolution, active optic fluorescence analyzer provides significant improvement in the energy resolution, due to improved control over the crystal shape together with the alignment procedure, which is important to obtain a logarithmic spiral, or any other shape of the crystal. Due to the multi-row design and the design of the pushers to eliminate any torsional forces from them, micrometers in the pushers to correct for torsion are no longer necessary in the new design of the invention.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In accordance with features of the invention, the analyzer of the invention addresses the needs in X-ray sciences to provide a high-resolution analyzer system with wide energy tunability, high collection efficiency and flexibility in the shape of the analyzer crystal, allowing various modes of use. Besides a single energy bandwidth application, which is the most efficient way for high-resolution spectroscopy on extremely dilute samples, imaging applications, and a single-shot spectroscopy can be performed, in which an entire spectrum must be recorded at once.

In accordance with features of the invention, the analyzer of the invention is suitable for any applications, which provide an x-ray point source. Besides classical use in synchrotron based applications, the analyzer is also useful in plasma source, free-electron-laser applications, conventional x-ray tubes, and high energy electron probes like electron transmission microscopes. The robust mechanical design, the flexibility and the fact that the user need not understand the details of the bending procedure makes the analyzer appropriate for portable applications, such as trace element analysis in industrial and environmental hygiene, homeland security applications, semiconductor industry, or nuclear waste management. Since shape errors can be corrected whenever required, the analyzer will also tolerate rough environmental factors like mechanical shocks, vibrations, or strongly changing temperature and humidity conditions. The largest commercial interest is found in the area of trace element analysis. In comparison to conventional detectors, the analyzer of the invention allows significantly increasing the detection limit, reducing the required sample amount and providing information about the chemical bonding of the trace element, which is essential not only to evaluate the mobility and bio-activity but also to characterize the status of chemical and physical processes, such as Pt in soot.

In accordance with features of the invention, the analyzer of the invention provides the ability to display the distribution of various elements in samples with high to moderate resolution. Examples span areas such as characterization of welding and solder connections, characterization of thermal barrier coatings in turbines and various engines, segregation and crystallization process, or drug delivery in biological systems. The excitation mechanism may be either electron beams or polychromatic x-rays. Especially the use of relative high energetic x-rays will allow the characterization of machines and systems without disassembly. It may be possible to characterize plates of turbines under working conditions. For most of these applications, the robust character and the easy use are essential.

Figure 2:
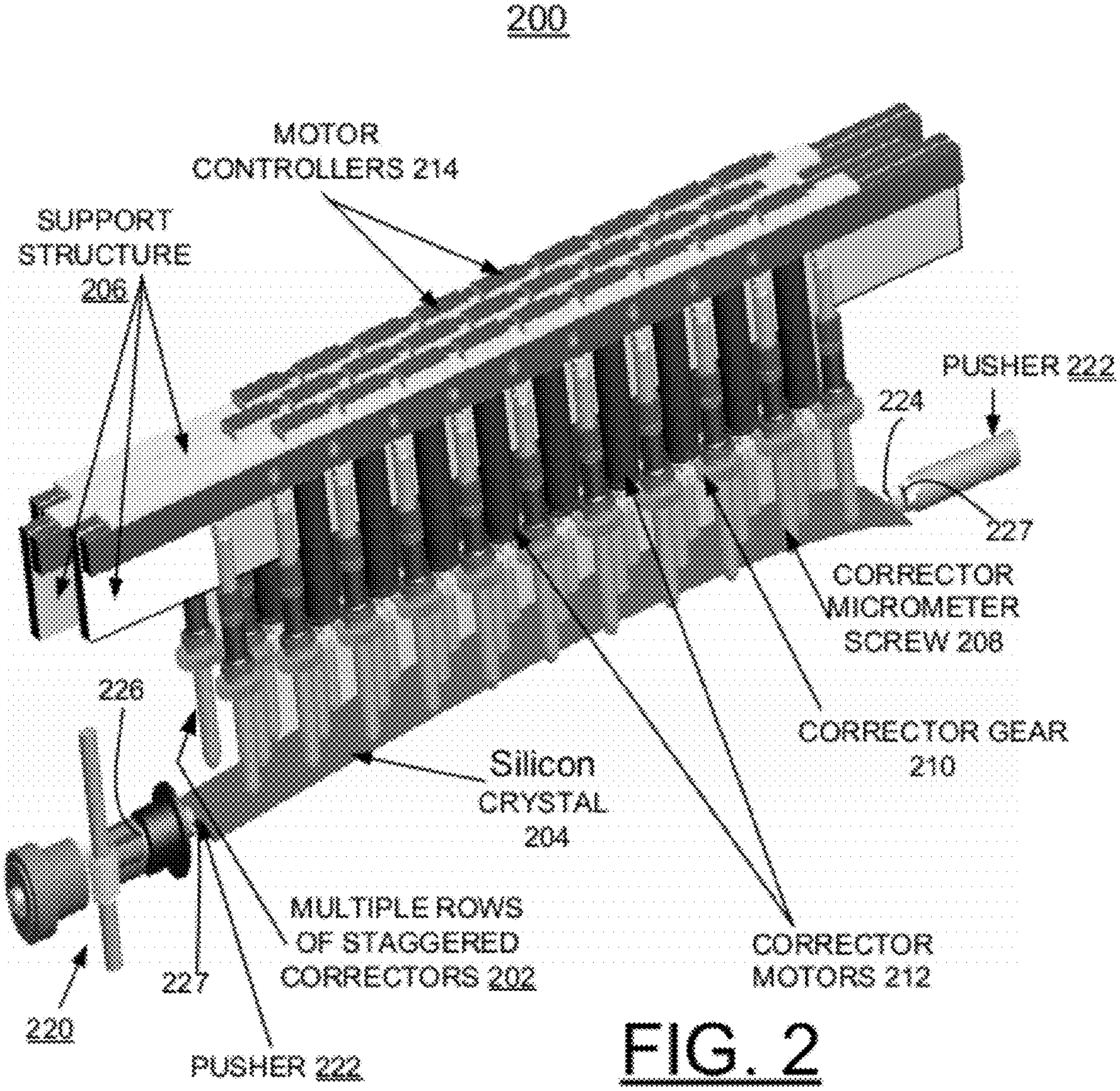
FIG. 2 is a schematic, perspective view illustrating a high-resolution, active optic fluorescence analyzer in accordance with the preferred embodiment.

Having reference now to the drawings, FIG. 2 illustrates an exemplary high-resolution, active optic fluorescence analyzer generally designated by reference character 200 in accordance with the preferred embodiment. The high-resolution, active optic fluorescence analyzer 200 includes a plurality of rows of staggered correctors 202 selectively controlled to bend an elongated strip of silicon crystal 204 into a precisely defined shape. The high-resolution, active optic fluorescence analyzer 200 incorporates three rows of shape correctors 202, for example, for a total of 33 correctors 202 in the 3 staggered rows. The correctors 202 are mounted on a support structure 206 implemented by a rigid aluminum structure designed to minimize deformation due to mechanical loading. The support structure 206 is formed of aluminum or other material having high thermal conductivity to facilitate the needed thermal control of the device.

Each of the correctors 202 includes a micrometer screw 208 for selectively engaging and deforming the silicon crystal 204, and a corrector gear 210. The high-resolution, active optic fluorescence analyzer 200 includes a plurality of corrector motors 212, each operatively controlled by a respective motor controllers 214, engaging the corrector gear 210 to selectively position the micrometer screw 208 of the correctors 202. The corrector motors 212 and motor controllers 214 also are carried by the support structure 206.

During operation, the high-resolution, active optic fluorescence analyzer 200 is kept at a constant temperature independent from the environment temperature to eliminate deformations of the silicon strip 204 due to the different thermal expansion coefficients of aluminum and silicon.

The high-resolution, active optic fluorescence analyzer 200 includes pusher mechanics generally designated by reference character 220, and a pair of pushers 222 engaging opposite ends of the strip of silicon crystal 204 to exert only a force along the long axis of the crystal strip 204, and substantially without inducing any bending moments, which would result in a torsion of the crystal. To accomplish a compact design all mechanics of the pushers 222 and correctors 202 are designed under the considerations of heat-management and high packing density. A plurality of motor controllers 214 including driver electronics for the actuators or correctors 202 are integrated into the device support structure 206, thus eliminating the tangle of control cables and easy handling.

Figure 1:
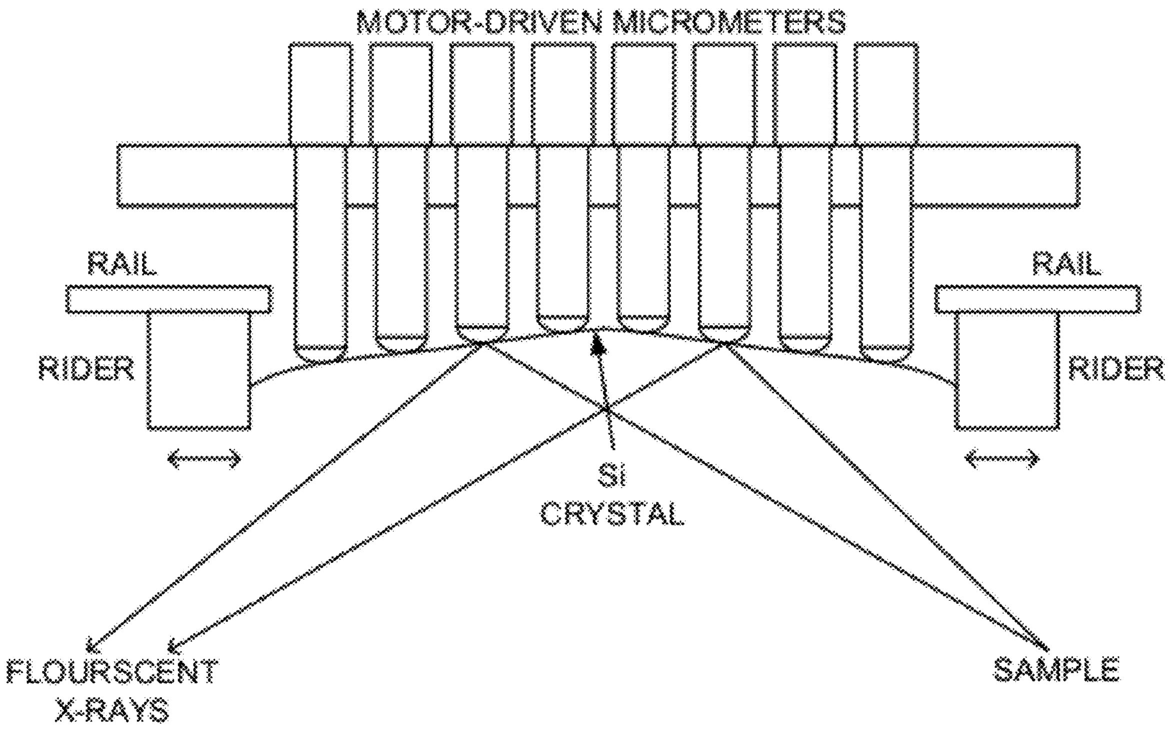
FIG. 1 illustrates a prior art fluorescence analyzer.

The high-resolution, active optic fluorescence analyzer 200 is constructed on the basis of a rigid aluminum support structure 206. On each of the pair of pushers 222 that engage opposite ends of the strip of silicon crystal 204, pusher mechanics 220 include an aluminum block 226 with weak link mechanism 227 and the pusher mechanics 220 holds a crystal-engaging portion of pusher 222, such as with a steel member, having a groove 224 that fits to the end of the silicon crystal strip 204. The pusher mechanics 220 is used to make the groove 224 line up with the edge of the silicon crystal strip 204, so that the force is applied evenly. This is a very critical adjustment, as the silicon strip 204 tends to be twisted in addition to buckling up in conventional arrangements, such as in the prior art arrangement shown in FIG. 1.

The correctors 202 are inserted into holes along the aluminum support structure 206, for example, spaced 13 mm from each other. The correctors 202 are capable of submicron resolution, which turned out to be very necessary to achieve the best energy resolution. Initially, a plastic buffer layer was placed on top of the silicon strip, so the corrector tips would not press directly onto the thin silicon. However, this is not required and the analyzer 200 is now being used without this buffer.

Figure 3:
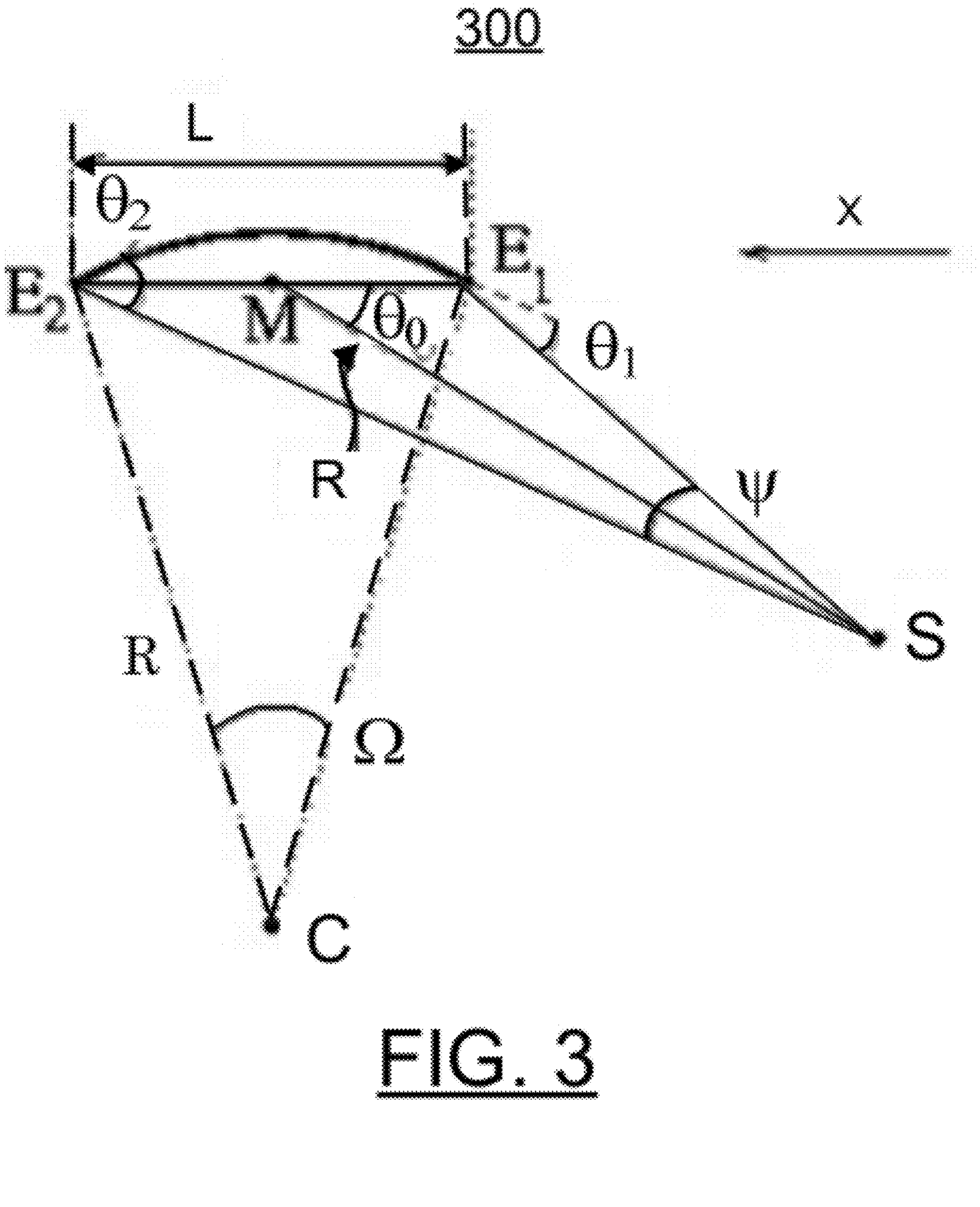
FIG. 3 is a schematic illustrating geometry relating the mean radius of curvature, R, to the sample-to-analyzer distance R in the high-resolution, active optic fluorescence analyzer of FIG. 2 in accordance with the preferred embodiment.

Referring also to FIG. 3, there is shown geometry relating the mean radius of curvature, $\mathcal{R}$, to the sample-to-analyzer distance R in the high-resolution, active optic fluorescence analyzer 200 generally designated by reference character 300 in accordance with the preferred embodiment. The high-resolution, active optic fluorescence analyzer 200 uses active optics with a large number of actuators 202 to control the shape of a silicon crystal 204, which is used in the Bragg geometry. The actuators 202 permit a shape control that is sufficiently precise, such as, less than a 1 eV resolution within a large solid angle, yet leave the flexibility to tune the pass energy over a large range.

With fluorescent photon energies between ca. 6.5 and 11 keV, which is where the device has been tested, and using the symmetric (400) reflection from silicon, the Bragg angle is between ca. 45 and 24.5 degrees, the working distance R from the sample to the center of the silicon strip 204 is between ca. 350 mm and 600 mm, and the mean radius of curvature, R, is ca. 0.8 m. Inserting y=7:1 mm ($1/\sqrt{2}$ of the 10-mm half width), R=450 mm, and Bragg angle, Θ=30°, the contribution to the energy resolution is $\Delta E/E \simeq 2{:}5*10^{-4}$ (assuming ν=0:2, but the anticlastic term is of minor importance).

The optical element 204 in a non-dispersive x-ray fluorescence analyzer 200 must be bent to a well-defined shape, such as, a logarithmic spiral in case that a crystal with homogeneous lattice spacing is being used, such as here with silicon crystal 204. An estimate of the amount of bending necessary can be found as follows for the case of a long narrow crystalline strip bent cylindrically to a radius of curvature, $\mathcal{R}$. Where R is the distance from the sample at S to a point M halfway between the endpoints E1; E2 of bent crystal strip 204 over a baseline of length L, then the angle ψ that the strip subtends from S is given by $\psi \simeq \sin\theta_0 L/R$, where $\theta_0$ is the angle between the ray from S to M and the baseline between $E_1$ and $E_2$. Likewise, the angle Ω that the strip subtends from the center of curvature, C, is given by $\Omega \simeq L/R$. In the nondispersive operation, all rays coming out of point S strike the crystal surface at the same angle θ. In the cylindrical approximation employed here, this can be demanded of two of these angles, and $\theta_0$ is set to be the Bragg angle, Θ. Thus setting $\theta_1=\theta_2$ in FIG. 3 immediately leads to ψ=Ω, which, in turn, yields $$R=\sin\Theta \quad (1)$$

A similar calculation is carried out to higher accuracy in app. C. Considering now factors that influence the energy resolution, and relate it to angular variations ΔΘ, widths, etc. through Bragg's law in differential form by $$dE/E=\cot\Theta d\Theta, \quad (2)$$

The energy resolution then comprises of the following contributions: i) the local rocking width, converted to energy bandwidth by equation (2), of the bent, but otherwise perfect crystal, as determined by dynamical diffraction theory, ii) a widening due to imperfections, such as mosaic spread, local strain, and the like, in the crystal, iii) divergences of the incident radiation, and iv) aberrations and shape errors in the optics themselves.

Even if the center line of the bent crystal forms a logarithmic spiral with the proper parameters for a given source point S and incidence angle θ, equal to the Bragg angle Θ for a symmetrically cut crystal, a ray that hits the crystal off to either side of the center line at a distance of y will have a different incidence angle due to simple ray geometry and due to anticlastic bending. For a strip that is narrow in comparison to the distance from the origin, both these angular errors are small and can treated independently of each other.

There are two contributions to error, $\Delta\Theta_g$ from simple ray geometry and $\Delta\Theta_a$ from anticlastic bending. The former is calculated to be $\Delta\Theta_g=-y^2/2R^2 \cos\Theta$, where R is the distance from the sample to the analyzer, and the latter is calculated to be $\Delta\Theta_a=-y^2\nu_{xy} \sin^3\Theta=2R^2 \cos\Theta$, where $\nu_{xy}$ is the elastic Poisson ratio coupling the x and y directions of the crystal strip.

Figure 4:
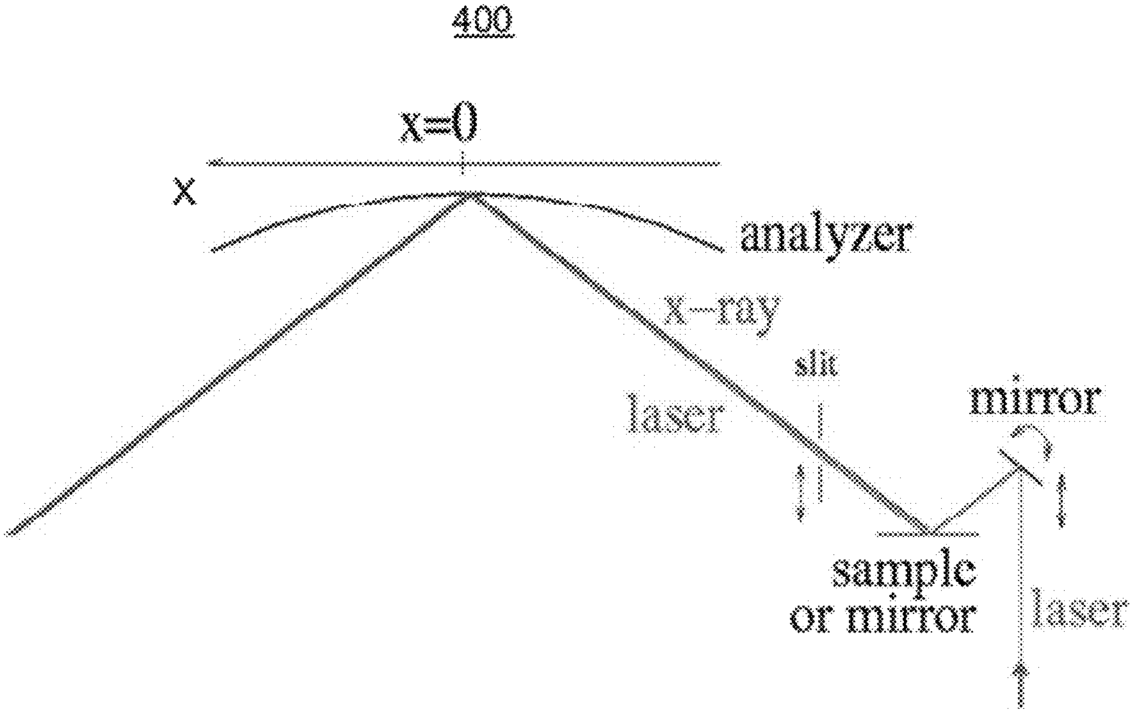
FIG. 4 is a schematic illustrating the use of a laser to trace out rays through the high-resolution, active optic fluorescence analyzer of FIG. 2, and to calibrate a slit that provides well-defined x-ray paths in accordance with the preferred embodiment.

FIG. 4 illustrates the use of a laser to trace out rays through the high-resolution, active optic fluorescence analyzer 200, and to calibrate a slit that provides well-defined x-ray paths generally designated by reference character 400 in accordance with the preferred embodiment.

Experience with the analyzer 200 shows that the tools and procedures used to adjust the shape are an extremely important part of the device operation. The first step is always to establish a horizon plane at the sample height with the help of a theodolite, and to determine the height of one particular point on the crystal relative to this plane along with its lateral distance from the sample. These distances, together with the Bragg angle determine the ideal shape of a logarithmic spiral.

In a first step, using a point-like light source, bend the crystal to focus from the sample location to the detector and remove torsion in the crystal strip. Next in a second step, using a HeNe laser, trace out individual ray paths from the sample to the detector by way of different sections of the analyzer crystal and calibrate positions of a slit to match these ray, referring to FIG. 4. In a third step, using the slit calibrated in step no. 2, locally on the analyzer crystal measure the angular peak positions of the reflection of the x-ray fluorescence of interest coming from the sample. This data is transformed to indicate the necessary motions of the shape correctors 202. Then step 3 is iteratively repeated until the desired accuracy is achieved.

Step no. 1 is done using, for example, a bare laser diode placed in the sample location, i.e., the nominal origin of the logarithmic spiral. Its luminous area is rather small, thus well approximating a point source of light, and its output divergence (without collimating optics) is sufficient to illuminate the entire solid angle covered by the bent silicon crystal. The crystal can now be made to focus vertically 1:1 from the diode to the detector, and thus assume the shape of an ellipse. There is no focusing in the horizontal direction, and thus the light from the diode is spread into a width about twice that of the crystal. Any twist, or torsion, in the crystal shape results in a wedge-shaped image instead of a line. By iteratively working the pushers 222 at the ends of the crystal and moving the shape correctors 202, one can reduce this twist and at the same time give the crystal an elliptical shape that is already close to that of the logarithmic spiral with the correct parameters.

For step no. 2, referring to FIG. 4, the beam from a Helium-Neon laser is reflected first into the vertical direction, and then onto a mirror on a rotation stage, which, in turn, sits on a vertical translation stage. For maximum visibility at the limited power of class II, and also to minimize the beam size and divergence, we used a HeNe laser emitting green light at the wavelength of 543 nm. With the combined motion of the two stages, the laser beam can be made to hit the sample at varying angles in the exact same spot where the incident x-rays hit, and thus the fluorescence is emitted. By putting a horizontal mirror in the sample location as indicated by sample or mirror, or making use of the reflectivity of the sample itself (most of our work was done with GaAs), the laser beam is then reflected at a selectable angle from the sample to the analyzer crystal, which, in turn, reflects the laser beam to the x-ray detector. Residual diffuse scattering makes the spot visible where the laser beam hits the analyzer crystal, and a slit position can then be associated with the x coordinate (along the crystal strip) of this spot.

Step no. 3: The final step in the alignment procedure is based upon the x-rays themselves. Fluorescence at the energies of interest is generated by x-rays hitting the sample, and is transmitted through the now-calibrated slit to only a small part of the silicon crystal (a few mm along the crystal and its entire width). By rotating the entire device 200 as shown in FIG. 2, an x-ray reflectivity rocking curve is recorded.

Figure 5:
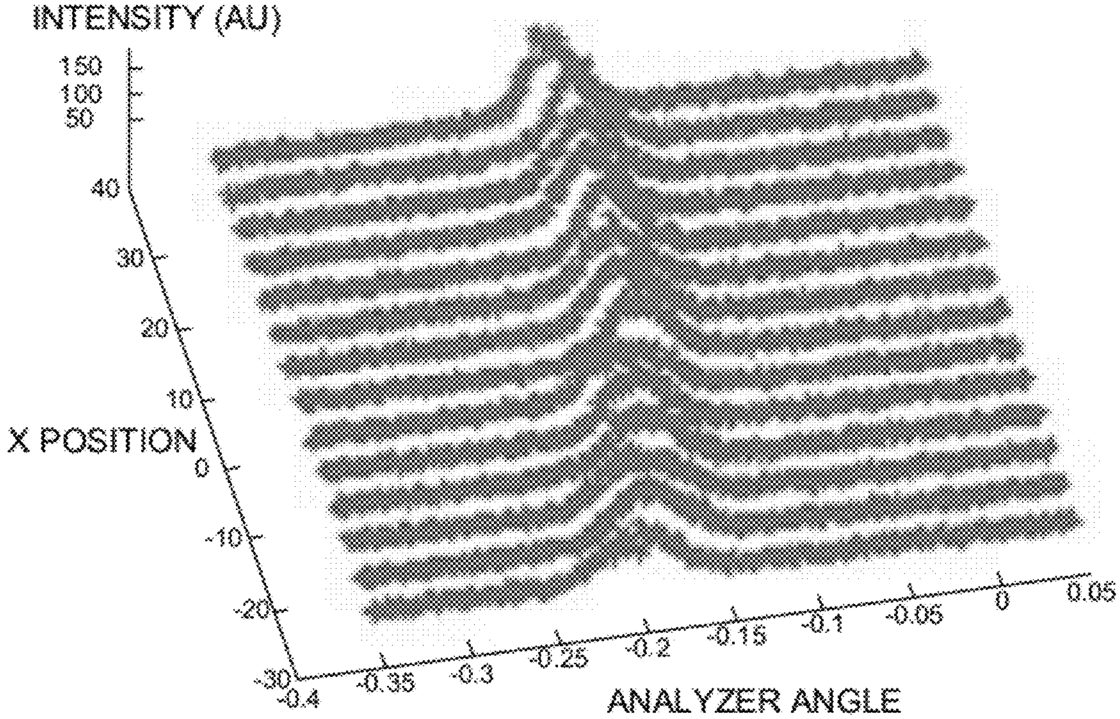
FIG. 5 is a schematic illustrating reflected intensity of the Ga $K_\beta$ fluorescence in rocking scans of the high-resolution, active optic fluorescence analyzer of FIG. 2 for a set of slit settings, selecting x positions on the crystal in accordance with the preferred embodiment.

A sequence of such scans for a number of locations along the silicon crystal can then be evaluated through curve fits of the rocking scans to yield a map of the local angular deviations from the ideal shape (up to an arbitrary constant angular offset). An example is shown in FIG. 5 for the Ga $K_\beta$ line and a not-yet-perfect shape of the analyzer. This map of angular deviations is related to the derivative of the real-space shape, which may be reconstructed approximately through an integration, or more accurately, through a Fourier expansion. The integration method or Fourier expansion is used to compute the corrections for correctors 202 from the angular deviation data.

FIG. 5 illustrates reflected intensity of the Ga $K_\beta$ fluorescence in rocking scans of the high-resolution, active optic fluorescence analyzer 200 generally designated by reference character 500 for a set of slit settings, selecting x positions on the crystal in accordance with the preferred embodiment.

Figure 6:
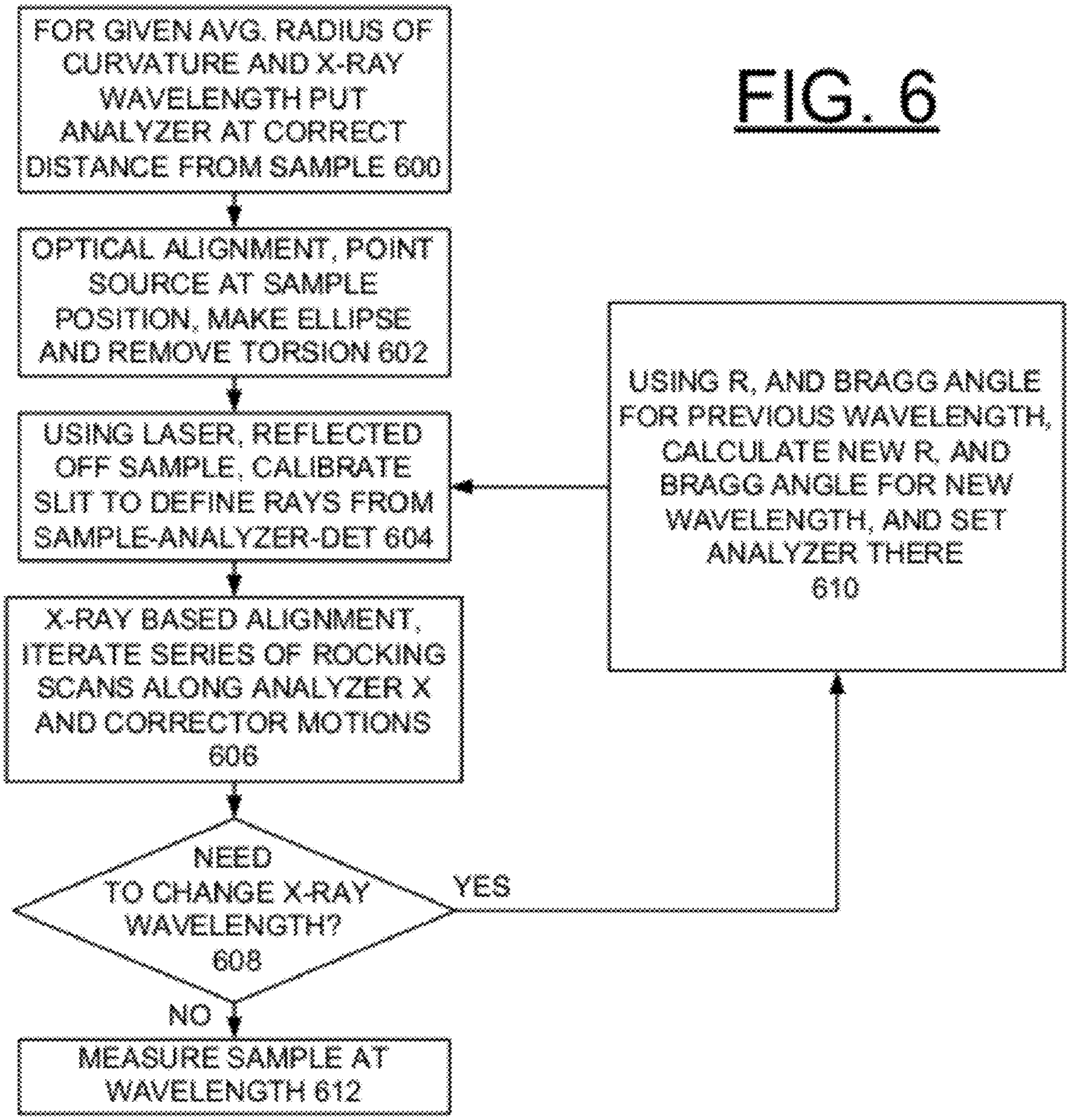
FIGS. 6 and 7 are respective flow charts illustrating exemplary steps for implementing alignment the high-resolution, active optic fluorescence analyzer of FIG. 2 in accordance with the preferred embodiment.
Figure 7:
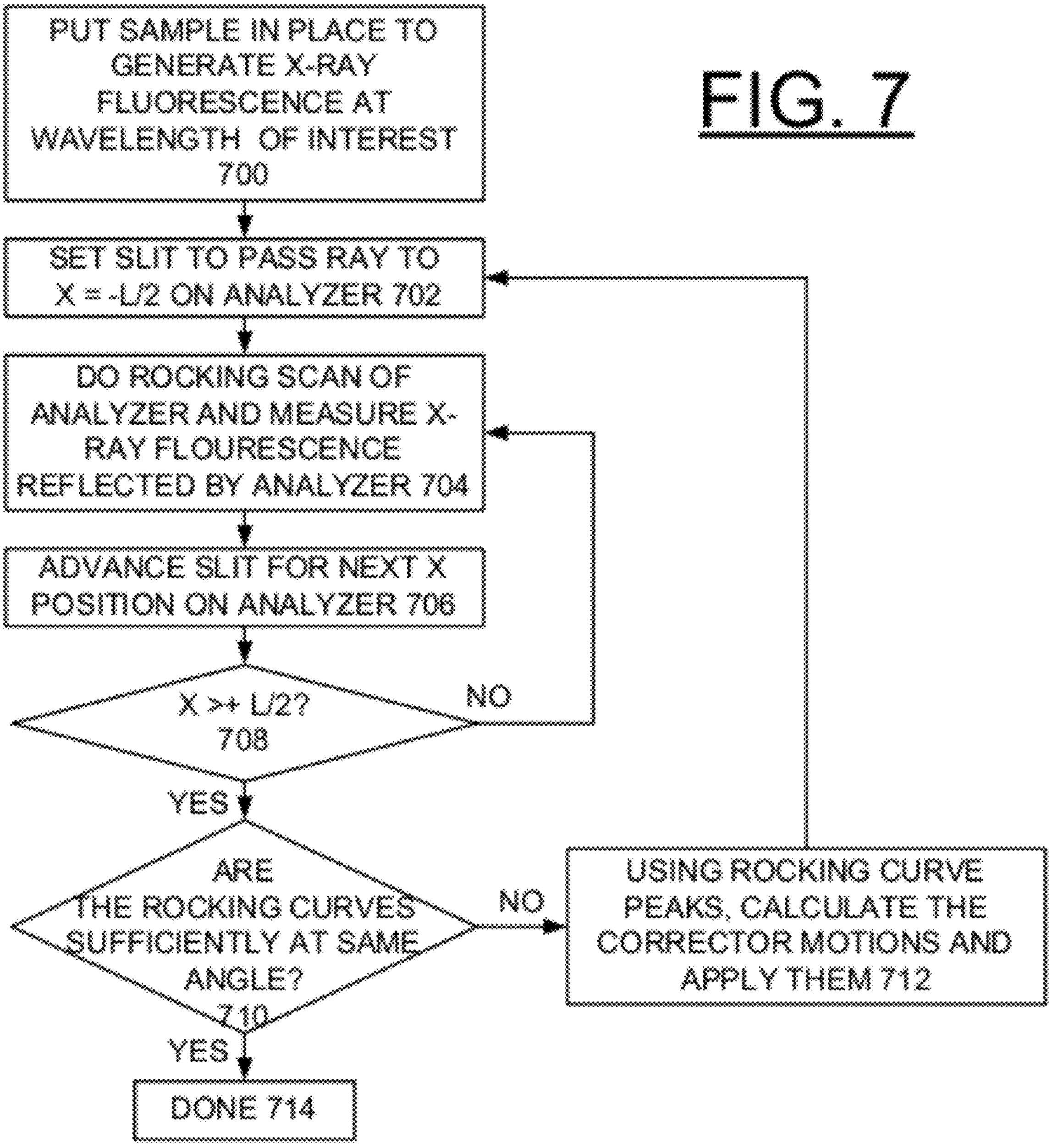

FIGS. 6 and 7 are respective flow charts illustrating exemplary steps for implementing alignment in the high-resolution, active optic fluorescence analyzer 200 in accordance with the preferred embodiment.

Referring to FIG. 6, first as indicated at a block 600 for a give average radius of curvature and x-ray wavelength λ of interest, put analyzer at correct distance R from sample, as described in equation (1) and as illustrated and described with respect to FIG. 3. The above-described step 1 is performed to provide optical alignment with point source at sample position, to make ellipse and remove torsion as indicated at a block 602. Next above-described step 2 is performed using the laser reflected off sample, to calibrate the slit to define rays from sample, to analyzer-detector as indicated at a block 604. Then an x-ray rocking curve is recorded using x-ray based alignment, a series of rocking scans along analyzer x direction, as shown in FIGS. 3 and 4, and corrector motions, as indicated at a block 606. Checking for the need to change the x-ray wavelength is performed as indicated at a decision block 608.

When needed to change the x-ray wavelength, using the radius R, and the Bragg angle Θ, as illustrated in FIG. 3, for the previous x-ray wavelength, then a radius R, and the Bragg angle Θ, for the new x-ray wavelength is calculated, and the analyzer is put there as indicated at a block 610.

For a given curvature the angle δψ subtended by the crystal strip 204 must be the same as the change in crystal surface orientation over its length. Therefore, when tuning the analyzer to a different energy and thus changing its aspect angle (=Θ), then its distance R from the origin at C must be changed to keep δψ constant. Thus with δψ being a function of R and Θ, the total differential d(δψ) must be 0. This condition yields a proportionality relation between dΘ and dR, and thus a differential equation for dR/dΘ. In order to avoid formula clutter, using the approximate version $\delta\psi \approx L \sin\Theta/R$ to obtain:

$$DR/d\Theta \approx R \cot\Theta \qquad (3)$$

Then the sequential steps are repeated returning to block 604. Otherwise, when no need to change the x-ray wavelength is determined at decision block 608, then the sample is measured at the set x-ray wavelength as indicated at a block 612.

Referring now to FIG. 7, there are shown exemplary steps performed using the laser reflected off sample, to calibrate the slit to define rays from sample, to analyzer-detector at block 604 in FIG. 6. First a sample is put in place to generate x-ray fluorescence at the wavelength of interest as indicated at a block 700. The slit illustrated in FIG. 4 is set to pass ray to x=−L/2 on the analyzer as indicated at a block 702. Next a rocking scan of the analyzer is performed and the x-ray fluorescence reflected by the analyzer is measured as indicated at a block 704. Then the slit is advance to a next x position on the analyzer as indicated at a block 706. Check whether the position on the analyzer is greater than +L/2 is performed as indicated at a decision block 708. If the position on the analyzer is not greater than +L/2, then the sequential steps are repeated returning to block 704 to perform a next rocking scan of the analyzer and measuring the x-ray fluorescence reflected by the analyzer. When the position on the analyzer is greater than +L/2, then checking whether the rocking curves are sufficiently at the same angle is performed as indicated at a decision block 710. When the rocking curves are not sufficiently at the same angle, then using rocking curve peaks, the corrector motions are calculated and applied as indicated at a block 712. Then the sequential steps are repeated returning to block 702.

While the present invention has been described with reference to the details of the embodiments of the invention shown in the drawing, these details are not intended to limit the scope of the invention as claimed in the appended claims.

What is claimed is:

1. Active optics apparatus for a high-resolution, active optic x-ray fluorescence analyzer comprising:

an elongated strip of crystal;

a plurality of rows of correctors, said correctors selectively controlled to bend an said elongated strip of crystal into a precisely defined shape for controlling x-ray diffraction properties; said correctors being selectively controlled using x-rays to determine a deviation of a crystal shape from said precisely defined shape; and a pair of pushers engaging opposite ends of said elongated strip of crystal to exert only a force along a long axis of said elongated strip of crystal, and substantially without inducing bending moments on said elongated strip of crystal.

2. The active optics apparatus for a high-resolution, active optic x-ray fluorescence analyzer as recited in claim 1 wherein said elongated strip of crystal includes an elongated strip of silicon crystal.

3. The active optics apparatus for a high-resolution, active optic x-ray fluorescence analyzer as recited in claim 1 wherein said plurality of rows of correctors includes a plurality of staggered rows of multiple connectors.

4. The active optics apparatus for a high-resolution, active optic x-ray fluorescence analyzer as recited in claim 1 wherein said plurality of rows of correctors are arranged in staggered rows enabling control over torsion and anticlastic bending of said elongated strip of crystal.

5. The active optics apparatus for a high-resolution, active optic x-ray fluorescence analyzer as recited in claim 1 wherein each corrector of said plurality of rows of correctors include a micrometer screw for selectively engaging and deforming said elongated strip of crystal.

6. The active optics apparatus for a high-resolution, active optic x-ray fluorescence analyzer as recited in claim 5 wherein each said corrector includes a corrector gear coupled to said micrometer screw.

7. The active optics apparatus for a high-resolution, active optic x-ray fluorescence analyzer as recited in claim 1 include a plurality of motor controllers, each motor controller controlling a respective corrector of said plurality of rows of correctors.

8. The active optics apparatus for a high-resolution, active optic x-ray fluorescence analyzer as recited in claim 1 wherein each corrector of said plurality of rows of correctors include a micrometer screw for selectively engaging and deforming said elongated strip of crystal and a corrector gear coupled to said micrometer screw.

9. The active optics apparatus for a high-resolution, active optic x-ray fluorescence analyzer as recited in claim 1 wherein each corrector of said plurality of rows of correctors is mounted on a support structure.

10. The active optics apparatus for a high-resolution, active optic x-ray fluorescence analyzer as recited in claim 9 includes a plurality of motor controllers mounted on said support structure.

11. The active optics apparatus for a high-resolution, active optic x-ray fluorescence analyzer as recited in claim 9 wherein said support structure is formed of a material having high thermal conductivity.

12. The active optics apparatus for a high-resolution, active optic x-ray fluorescence analyzer as recited in claim 9 wherein each of said pair of pushers is mounted on said support structure.

13. The active optics apparatus for a high-resolution, active optic x-ray fluorescence analyzer as recited in claim 1 wherein each of said pair of pushers includes a support block with weak link mechanisms.

14. The active optics apparatus for a high-resolution, active optic x-ray fluorescence analyzer as recited in claim 13 wherein said each of said pair of pushers includes a crystal-engaging portion having a groove mating with a respective one of said opposite ends of said elongated strip of crystal.

15. The active optics apparatus for a high-resolution, active optic x-ray fluorescence analyzer as recited in claim 14 wherein said groove is aligned with the respective one of said opposite ends of said elongated strip of crystal.

16. A method for aligning active optics for a high-resolution, active optic x-ray fluorescence analyzer including an elongated strip of crystal, said method comprising the steps of:

providing a plurality of rows of correctors coupled to the elongated strip of crystal;

providing a pair of pushers engaging opposite ends of said elongated strip of crystal;

adjusting said pair of pushers to exert only a force along an elongated axis of said elongated strip of crystal, and substantially without inducing bending moments on said elongated strip of crystal; and selectively controlling said correctors using x-rays to determine a deviation of a crystal shape from a precisely defined shape to bend the elongated strip of crystal into said precisely defined shape for controlling x-ray diffraction properties.

17. A method for aligning active optics for a high-resolution, active optic x-ray fluorescence analyzer as recited in claim 16 wherein the step of providing a plurality of rows of correctors coupled to the elongated strip of crystal includes providing three staggered rows of correctors.

18. A method for aligning active optics for a high-resolution, active optic x-ray fluorescence analyzer as recited in claim 16 wherein the step of adjusting said pair of pushers to exert only a force along the elongated axis of said elongated strip of crystal includes providing a crystal-engaging pusher portion having a groove mating with a respective one of said opposite ends of said elongated strip of crystal.

19. A method for aligning active optics for a high-resolution, active optic x-ray fluorescence analyzer as recited in claim 16 wherein said elongated strip of crystal includes an elongated strip of silicon crystal.

* * * * *